United States Patent
Fleck et al.

(10) Patent No.: US 6,292,845 B1
(45) Date of Patent: Sep. 18, 2001

(54) PROCESSING UNIT HAVING INDEPENDENT EXECUTION UNITS FOR PARALLEL EXECUTION OF INSTRUCTIONS OF DIFFERENT CATEGORY WITH INSTRUCTIONS HAVING SPECIFIC BITS INDICATING INSTRUCTION SIZE AND CATEGORY RESPECTIVELY

(75) Inventors: Rod G. Fleck, Mountain View; Bruce Holmer, Belmont, both of CA (US); Ole H. Møller, Lyngby (DK); Roger D. Arnold, Sunnyvale; Balraj Singh, Morgan Hill, both of CA (US)

(73) Assignee: Infineon Technologies North America Corp.

( * ) Notice: Subject to any disclaimer, the term of this patent is extended or adjusted under 35 U.S.C. 154(b) by 0 days.

(21) Appl. No.: 09/140,474

(22) Filed: Aug. 26, 1998

(51) Int. Cl.[7] ............... G06F 9/30; G06F 9/40; G06F 3/00; G06F 15/00; G06F 15/76
(52) U.S. Cl. ............... 710/5; 710/38; 710/127; 712/1; 712/200; 712/204; 712/205; 712/206; 712/208; 712/209; 712/210; 712/215
(58) Field of Search ............... 364/258; 711/128, 711/213; 712/204–210, 6, 2, 213, 23, 24, 32, 215, 216, 245, 237, 1, 26, 200, 235, 300; 710/104, 5, 38, 127

(56) References Cited

U.S. PATENT DOCUMENTS

| 4,114,026 | * | 9/1978 | Fiorenza ............... 235/375 |
|---|---|---|---|
| 4,236,206 | | 11/1980 | Strecker et al. . |
| 4,280,177 | * | 7/1981 | Schorr et al. ............... 711/128 |
| 4,502,111 | * | 2/1985 | Riffe et al. ............... 712/204 |
| 4,530,050 | | 7/1985 | Fukunaga et al. . |
| 4,654,781 | | 3/1987 | Schwartz et al. . |
| 4,888,679 | * | 12/1989 | Fossum et al. ............... 712/6 |
| 5,051,885 | * | 9/1991 | Yates, Jr. et al. ............... 712/215 |
| 5,201,056 | | 4/1993 | Daniel et al. . |
| 5,371,864 | | 12/1994 | Chuang . |
| 5,488,710 | | 1/1996 | Sato et al. . |
| 5,537,629 | | 7/1996 | Brown et al. . |
| 5,898,851 | * | 4/1999 | Narayan et al. ............... 712/210 |
| 5,938,759 | * | 8/1999 | Kamijo ............... 712/209 |
| 5,987,235 | * | 11/1999 | Tran ............... 712/210 |
| 6,012,137 | * | 1/2000 | Bublil et al. ............... 712/36 |
| 6,134,650 | * | 10/2000 | Zuraski, Jr. et al. ............... 712/213 |
| 6,170,050 | * | 1/2001 | Koppala et al. ............... 712/210 |

\* cited by examiner

*Primary Examiner*—Thomas Lee
*Assistant Examiner*—Tanh Nguyen
(74) *Attorney, Agent, or Firm*—Fish & Richardson P.C.

(57) ABSTRACT

An instruction fetching unit is described for loading instructions from a memory processed by a data processing device. The instruction code can be of at least two different lengths, and each instruction contains at least a single bit indicating said instruction sizes. An instruction buffer coupled with an instruction size evaluation unit for determining the instruction size upon said at least single bit of said instruction is provided.

14 Claims, 4 Drawing Sheets

PROCESSING UNIT HAVING INDEPENDENT EXECUTION UNITS FOR PARALLEL EXECUTION OF INSTRUCTIONS OF DIFFERENT CATEGORY WITH INSTRUCTIONS HAVING SPECIFIC BITS INDICATING INSTRUCTION SIZE AND CATEGORY RESPECTIVELY

BACKGROUND OF THE INVENTION

The present invention relates to a data processing unit for executing instructions of different length. Modern processors are capable of processing instructions of different length. For example, a first or least significant byte of an instruction stream defines an operational code and therefore how many bytes of this particular instruction follow the first byte. These following bytes often define the respective operands of the specific operational code. In some embodiments of modern microprocessors the first byte does not define the length of an instruction but one of the following operands defines the final size of the instruction. Thus, an instruction can have any size within multiples of a byte. Nevertheless, the instruction fetch and decode units need to interpret the respective instruction to evaluate the size of the individual instructions to fetch the remaining parts of the respective instruction. This needs a lot of decoding logic and might slow down a respective processor in particular if an instruction is very long.

Therefore, some reduced instruction set computers only provide instructions with a single format. Hence, in particular 32 Bit or higher microprocessors need a lot of memory to store programs. Especially portable devices and small devices or low cost devices suffer under this requirement.

SUMMARY OF THE INVENTION

It is therefore an object of the present invention to provide a data processing unit with a high speed mechanism for fetching and decoding instructions of different length.

Another object of the present invention is to provide means to use short instructions for complex execution tasks.

According to the present invention an instruction fetching unit for loading instructions from a memory processed by a data processing device, whereby said instruction code can be of at least two different lengths, and whereby each instruction contains at least a single bit indicating said instruction sizes, comprises an instruction buffer coupled with an instruction size evaluation unit for determining the instruction size upon said at least single bit of said instruction.

To minimize the instruction size an instruction can use one or more implicit registers. Thus, even so a user cannot freely choose one register from a register file, complex instructions can be executed while minimizing instruction sizes and therefore the size of the instruction memory.

A method of processing instructions in a data processing unit having a pipeline structure, whereby said instruction code can be of at least two different lengths, according to the present invention comprises the steps of:
 a) fetching a sequential data stream from an instruction memory containing multiple instructions starting at an instruction address,
 b) determining upon at least a single bit of the first data of said data stream said instruction length,
 c) issuing said instruction with said length to a decode stage,
 d) incrementing said instruction address depending on the instruction length,
 e) repeating steps a) through d).

Another method of processing instructions in a data processing unit having at least two pipeline structures, whereby said instruction code can be of at least two different lengths, and whereby each pipeline executes instructions of a respective category, comprises the steps of:
 a) fetching a sequential data stream from an instruction memory containing multiple instructions starting at an instruction address,
 b) determining upon at least a single bit of the first data said instruction length,
 c) determining upon at least a further single bit of said first data said instruction category,
 d) determining upon at least a single bit of a second data the instruction length of a subsequent instruction,
 e) determining upon at least a further single bit of said second data the instruction category of said second instruction,
 f) issuing upon said determinations one or more instructions to the respective pipeline structures,
 g) incrementing said instruction address depending on the number of instructions and upon the instruction lengths and types,
 h) repeating steps a) through g).

DETAILED DESCRIPTION OF A PREFERRED EMBODIMENT

Figure 1:
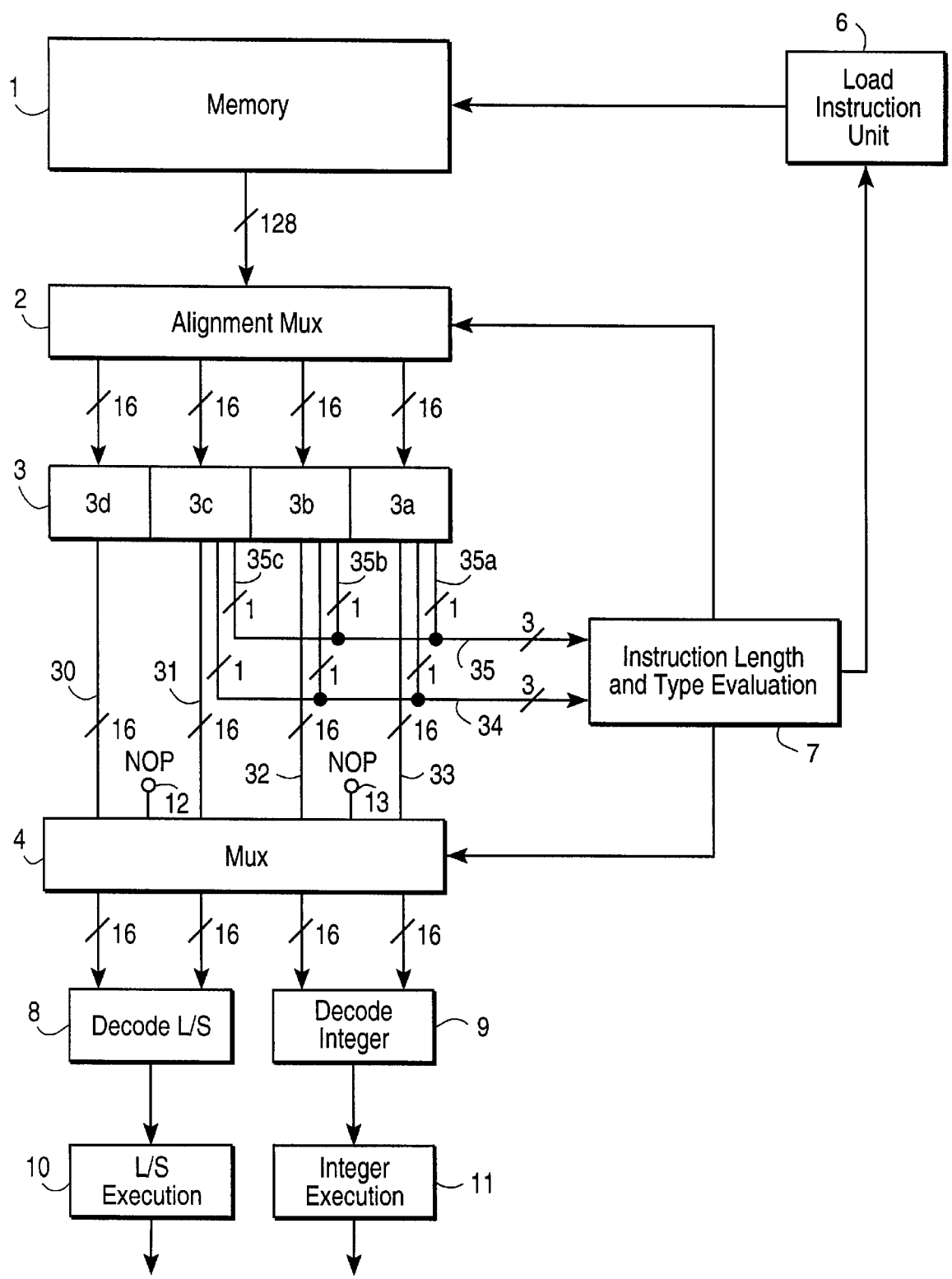
FIG. 1 is a block diagram of relevant parts of a data processing unit according to the present invention.

FIG. 1 shows a preferred embodiment of a 32 Bit microprocessor or microcontroller depicting the most relevant parts for fetching an instruction. A memory 1 is organized to be addressable in 128 bits. Thus, in this embodiment two 32 bit long-words or four 16 bit words out of 128 bits are transferable in parallel through an alignment multiplexer unit 2 which is controlled by an instruction length and type evaluation unit 7 to an instruction buffer 3. The multiplexer unit 2 can output four 16 bit words to instruction buffer 3. Instruction buffer 3 contains four 16 bit words 3a, 3b, 3c, and 3d. Instruction length and type evaluation unit 7 is coupled through six lines with the instruction buffer 3. Two bits of each instruction buffer word 3a, 3b, and 3c are evaluated by unit 7. Unit 7 controls alignment multiplexer 2 and an address generating instruction load unit 6. The outputs of instruction buffer 3 is coupled with another multiplexer 4 which is also controlled by unit 7. Multiplexer unit 4 may have two additional inputs 12 and 13 for supplying a no operation instruction which can be selected by multiplexer 4. Multiplexer 4 outputs two 16 bit words to a first decoder 8 and two 16 bit words to a second decoder 9. A load/store execution unit 10 follows decoding unit 8 and a integer execution unit 11 follows decoding unit 11 forming a load/store pipeline and a integer pipeline, respectively.

Instruction load unit 6 comprises usually a program counter coupled with an incrementer. The program counter addresses memory 1 which outputs an instruction data stream consisting of 128 bits to multiplexer 2 which aligns 64 bits of the data stream in an instruction register 3. instruction buffer 3a contains the first data word of the instruction and instruction buffer 3d contains the last data word of the 64 bit data stream. The instruction load unit 6 manages all necessary cycles to load the instruction data stream into instruction buffer 2. Usually, the data stream can be accessed within one processor cycle. In case of a boundary cross of a 64 bit instruction data stream within the 128 bit organization of the memory, the transfer of a 64 bit data stream may take two cycles. Any kind of memory with or without cache may be used with the present invention. Important is that multiple instructions, in this embodiment at least two instructions, are transferred to instruction buffer 3.

Instruction length and type evaluation unit 7 determines the size of the first and second instruction in the instruction stream stored in instruction buffer 3. Therefore, the least significant bit in each instruction indicates the size of the respective instruction. Unit 7 checks through control line 35a the size of the first instruction in the instruction stream. If this bit indicates a 16 bit size, then unit 7 checks line 35b of the second instruction in the instruction stream which would start at instruction buffer 3b. Otherwise, unit 7 checks line 35c to check the size of the second instruction.

A second bit in each instruction indicates the type of the respective instruction. in this embodiment, two pipeline structures are provided to allow execution of up to two instructions in parallel. The first pipeline structure forms a load/store pipeline which performs load and store, as well as any kind of branch and other special instructions. The second pipeline structure forms a integer pipeline which mainly performs data manipulations instructions. Of course, any kind of pipeline structure can be used with the present invention, for example floating point pipelines, etc. Depending on the instruction type bit of the first and second instruction, unit 7 can issue through multiplexer 4 one or two instructions in parallel to the following two pipelines 8, 10 and 9, 11, respectively. For example, if the first instruction is an integer operation and the second instruction is a load/store instruction multiplexer 4 issues a 16 bit integer instruction from instruction buffer 3a or a 32 bit integer instruction from instruction buffer 3a and 3b to integer decoder unit 9 depending on the information from control line 35a. In parallel, multiplexer 4 issues a 16 bit Load/store instruction from either instruction buffer 3b or 3c or a 32 bit load/store instruction from instruction buffer 3c and 3d depending on the information of control lines 35a and 35b or 35c. If two instructions of the same kind follow each other, then multiplexer 4 issues only one single instruction to one of each following pipeline structures 8, 10 or 9, 11. In this case, multiplexer 4 selects a no operation instruction from control lines 12 or 13 for the respective other pipeline structure.

In a less complex embodiment the instructions have to have a predefined order to be issued in parallel to the following pipeline structures. for example, a integer instruction has to be followed by an load/store instruction. In this case if the first instruction is a load/store instruction, only one instruction, namely the load/store instruction, can be issued no matter what the second instruction is. This embodiment can be easily provided by the instruction length and type evaluation unit 7 of FIG. 1.

For more complex processors with multiple pipelines and with the capability of executing instructions of more than two length sizes the embodiment of FIG. 1 can be expanded easily. For example, two size-bits can determine up to four instruction sizes and two type-bits can determine up to four pipelines, etc.

Figure 2:
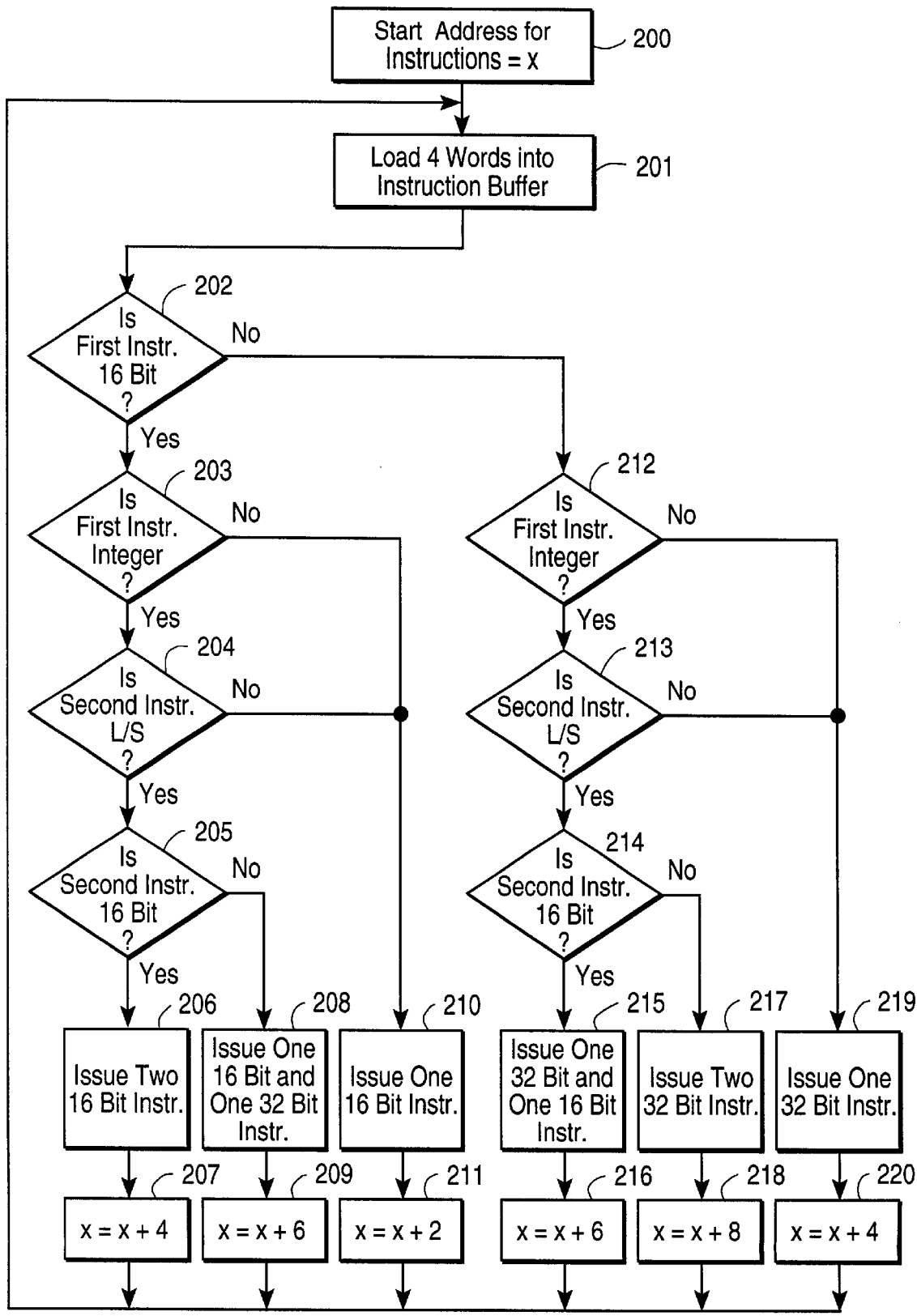
FIG. 2 is a flow chart showing the mechanism of fetching instructions from a instruction stream.

Upon determination of size, type and number of instructions issued to the pipeline structures, instruction length and type evaluation unit controls instruction load unit 6 to increment the program counter by the appropriate address increment. FIG. 2 shows a sequential flow chart of the whole fetching and issuing procedure which can be executed partly in parallel. In the beginning a start address for loading instructions from memory 1 is set to x in step 200. In step 201 four 16 bit words are loaded in parallel into instruction buffer 3. In step 202 the size of the first instruction in the instruction stream is evaluated. If the size-bit is indicating a 16 bit instruction, then in step 203 it is evaluated whether the first instruction is a integer type instruction. If the type bit indicates an integer type instruction, then in step 204 it is evaluated whether the second instruction is a load/store type instruction. If yes, then in step 205 the size of the second instruction by means of the respective size bits is evaluated. If the size of the second instruction is also 16 bits, then in step 206 a 16 bit instruction is issued from instruction buffer 3a through multiplexer 4 to integer decoding unit 9 and a 16 bit instruction from instruction buffer 3b through multiplexer 4 to load/store decoding unit 8. Hereinafter, the start address x in the program counter is incremented by 4. If in step 205 a 32 bit instruction is evaluated, then in step 208 a 16 bit instruction is issued from instruction buffer 3a through multiplexer 4 to integer decoding unit 9 and a 32 bit instruction from instruction buffers 3b and 3c through multiplexer 4 to load/store decoding unit 8. Hereinafter, the start address x in the program counter is incremented by 6. If the decision in step 203 or in step 204 is no, then in step 210 a 16 bit instruction is issued from instruction buffer 3a through multiplexer 4 to either integer decoding unit 9 or to load/store decoding unit 8 and a no operation instruction is issued from lines 12 or 13 through multiplexer 4 to the respective other decoding unit 8. Hereinafter, the start address x in the program counter is incremented by 2.

If the decision in step 202 is no then in step 212 it is evaluated whether the first instruction is an integer type instruction. If the type bit indicates an integer type instruction, then in step 213 it is evaluated whether the second instruction is a load/store type instruction. If yes, then in step 214 the size of the second instruction by means of the respective size bits is evaluated. If the size of the second instruction is also 16 bits, then in step 215 a 32 bit instruction is issued from instruction buffers 3a and 3b through multiplexer 4 to integer decoding unit 9 and a 16 bit instruction from instruction buffer 3c through multiplexer 4 to load/store decoding unit 8. Hereinafter, the start address x in the program counter is incremented by 6. If in step 214 a 32 bit instruction is evaluated, then in step 217 a 32 bit instruction is issued from instruction buffers 3a and 3b through multiplexer 4 to integer decoding unit 9 and a 32 bit instruction from instruction buffers 3c and 3d through multiplexer 4 to load/store decoding unit 8. Hereinafter, the start address x in the program counter is incremented by 8. If the decision in step 212 or in step 213 is no, then in step 219 a 32 bit instruction is issued from instruction buffers 3a and 3b through multiplexer 4 to either integer decoding unit 9 or to load/store decoding unit 8 and a no operation instruction is issued from lines 12 or 13 through multiplexer 4 to the respective other decoding unit 8. Hereinafter, the start address x in the program counter is incremented by 2.

Figure 3A:
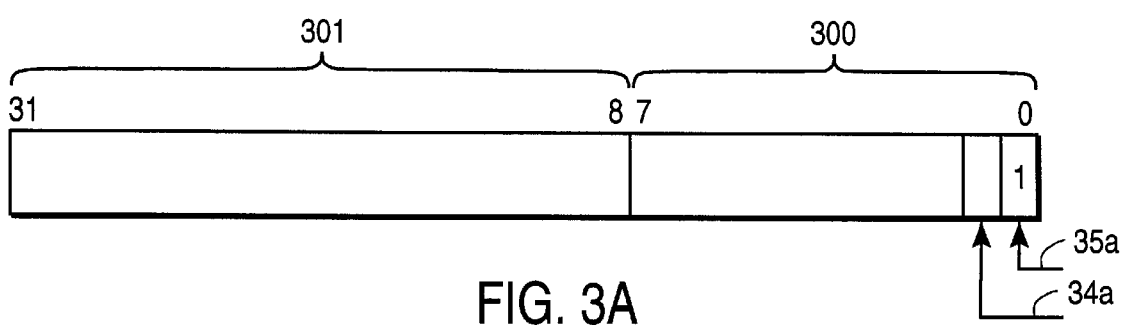
FIGS. 3a, 3b are representations of a 16 bit and a 32 bit instruction, respectively.

FIG. 3a shows the format of a typical 32 bit instruction. Bits 0 to 7 represent an opcode 300 whereas the rest 301 of the instruction, namely bits 8 to 31, can include further opcode information, operand information, absolute data, etc. Bit 0 which can be tested through control line 35a, 35b, 35c, respectively indicates whether the instruction is a 16 bit or a 32 bit instruction. If this bit is set to "1" then the instruction is 32 bits long and otherwise a 16 bits long. Bit 1 which can be tested through control line 34a, 34b, 34c, respectively indicates whether a load/store or an integer instruction is present. If bit 1 is set to 1 then a integer type instruction is present and otherwise a load/store instruction.

Figure 4A:
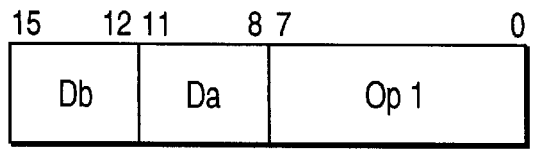
FIGS. 4a–4e are representations of different 16 bit instructions comprising implicit registers.
Figure 4B:
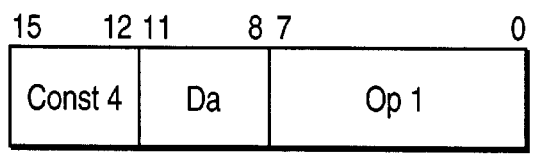
Figure 3B:
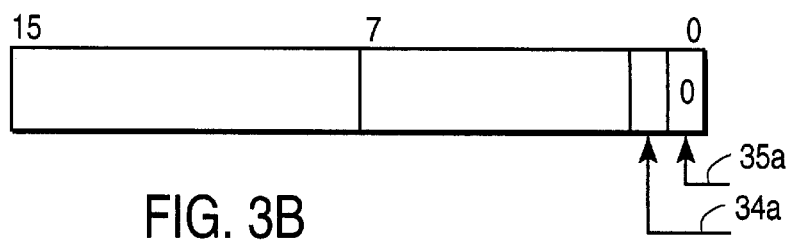

FIG. 3b shows the same schematic for a 16 bit instruction. Bits 0 to 7 again contains the opcode information whereby the least significant bit 0 and bit 1 indicate instruction length and type, respectively. As only 8 further bits in a 16 bit instruction are available for operand and other information, the variety and flexibility of 16 bit instructions is in some cases somewhat limited. Therefore according to the present invention a 16 bit instruction may use an implicit register with an instruction to enlarge the usage of further operands. FIGS. 4a through 4e show some instruction formats suitable to achieve this object. For example, a 16 bit instruction for performing a arithmetic or logical function on the contents of two registers and for storing the result in a different register can be performed with an instruction format according to FIG. 4a. Bits 0 to 7, for example, store the opcode for an "and"-instruction. Bits 8 to 11 select as a first operand one of sixteen data registers D0–D15 and bits 12 to 15 select as a second operand one of sixteen data registers D0–D15. The result is, for example, written into the implicit register D15. FIG. 4b shows for the same kind of instruction using a constant specified in bits 12 to 15 instead of a second register. If a specific target address other than D15 is need a 32 bit instruction for the same purpose has to be used. Nevertheless, in many cases it is sufficient to use an implicit register and memory space can be saved.

Figure 4C:
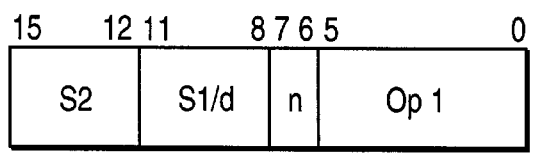

A further example is shown in FIG. 4c. this format is, for example, used with an instruction to perform a scaled address addition. S1/d defined in bits 8 to 11 define a first address register and S2 defined in bits 12 through 15 define a second address register. Bits 6 and 7 define a constant n=0, 1, 2, 3. The implicit data register, for example, register D2 is left-shifted by n, then added to the first address register and the result of this operation is stored in the second address register.

Figure 4D:
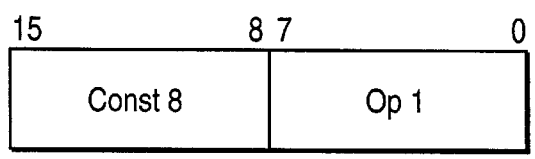

FIG. 4d shows another example for a logical or arithmetic operation. This format can be used to add, and, or, etc a 8 bit constant const8 defined in bits 8 through 15 to an implicit register, for example, data register D15.

Figure 4E:
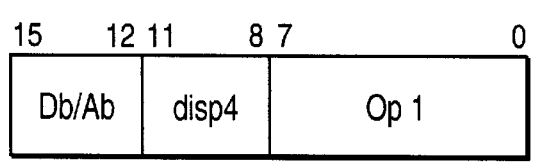

FIG. 4e shows an example for a conditional 16 bit jump instruction. In this type of instruction, for example, a jump to a relative address from the current program counter defined through the displacement value disp4 in bits 8 to 11 is performed if the content of implicit register D15 is equal to the content of the register defined Db/Ab defined in the bits 12 through 15.

Using implicit registers opens up a wide variety of different complex 16 bit instructions. Modern compiler can compensate the drawback of using implicit registers and therefore create very efficient code which need a minimum of memory space.

Figure 5:
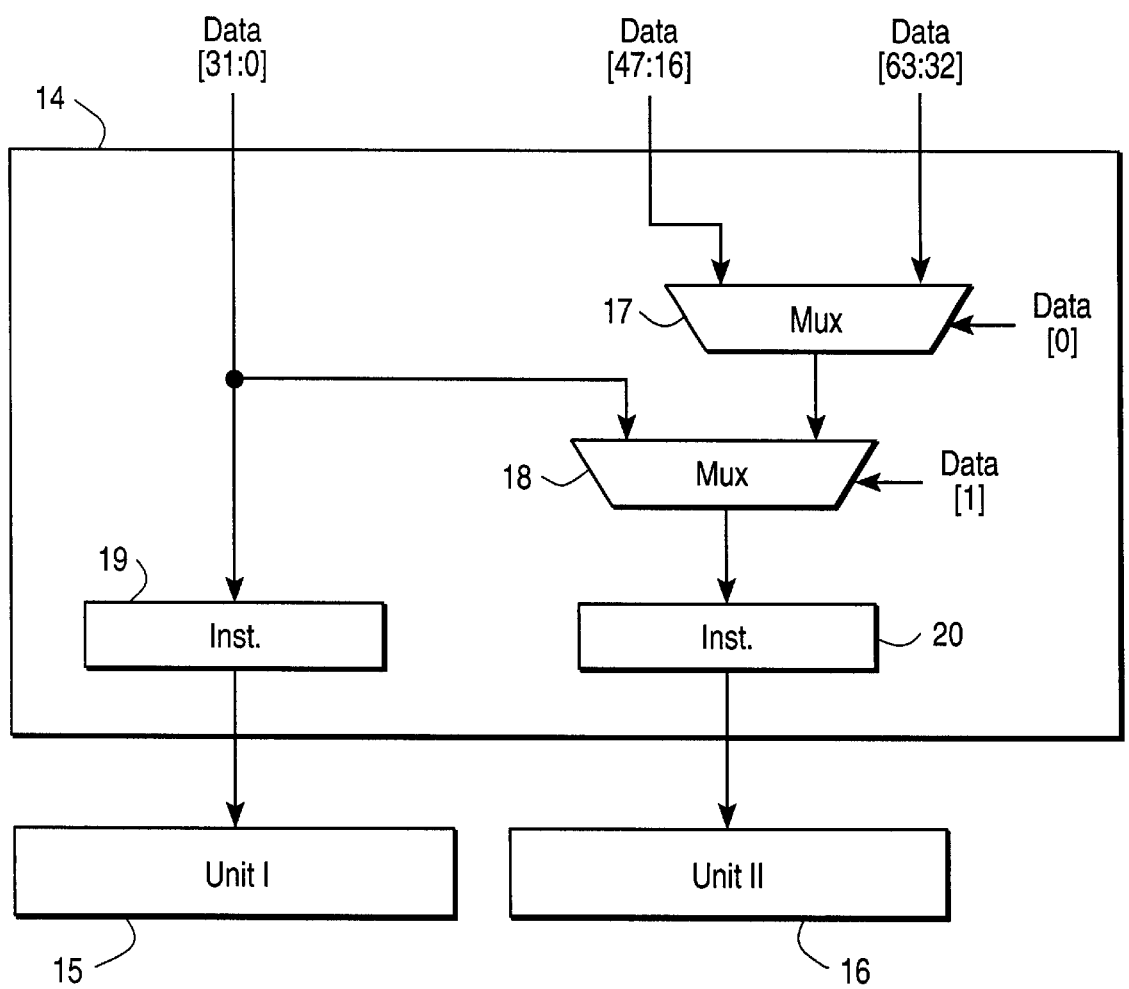
FIG. 5 shows another embodiment according to the present invention.

FIG. 5 shows another embodiment of a unit capable of evaluating instruction size and instruction type and distributing the respective instructions to the respective pipelines. A 64 bit data word is divided into 3 parts consisting of Data[31:0], Data[47:16], and Data[63:32]. Data[31:0] is fed to an instruction buffer 19 which supplies either an 16 or 32 bit instruction to pipeline unit 1. Data[47:16] is fed to the first input of a multiplexer 17. Data[63:32] is fed to the second input of multiplexer 17. Multiplexer 17 is controlled by Data[0]. The output of multiplexer 17 is coupled with the first input of a second multiplexer 18 whose second input receives Data[31:0]. Multiplexer 18 is controlled by Data[1]. The output of multiplexer 18 is coupled with instruction buffer 20 which supplies pipeline unit II with the respective 16 or 32 bit instructions.

In this embodiment two pipelines are provided. A first pipeline unit I is, for example, responsible for integer instructions and a second pipeline unit II for load/store instructions. In this arrangement two instructions can only be issued if the first instruction is issued to pipeline unit I. Then, if the second instruction is designated for pipeline II, a second instruction can be issued in parallel.

As shown in FIG. 5 the first instruction in Data[31:0] is issued directly to pipeline I or through multiplexer 18 to pipeline II without any alignment depending on Data[1]. The second instruction in the issue group is selected based on the size of the first instruction. Thus, the control for the multiplexer 17 is Data[0] of the first instruction. This multiplexer 17 selects between Data[16:47] and Data[63:32]. The pipelines I and II are always presented with 32 bits from the instruction stream irrespective of the actual size of the instruction. They then pick the number of bits they need to decode from the presented instruction based on Data[1].

In this arrangement the first instruction can be issued to pipeline I or pipeline II and the second instruction can only be issued to Pipeline II. Also, if the first instruction is issued to pipeline II then there is no dual issue. This is implementation specific and adding additional multiplexers in the above circuit can allow a more orthogonal issue scheme. Nevertheless, this scheme simplifies the implementation very much and any performance loss can be compensated with optimizing compilers which rearrange the instructions in an appropriate manner.

What is claimed is:

1. Instruction fetching unit for loading instructions from a memory processed by a data processing device, whereby said instructions can be of at least two different lengths, and whereby each instruction contains at least a single bit indicating instruction size, comprising an instruction buffer coupled with an instruction size evaluation unit for determining the instruction size upon said at least single bit of said instruction, and further comprising an instruction type evaluation unit, wherein said data processing device comprises at least two independent execution units for execution of at least two instructions in parallel, whereby the execution units execute instructions of a respective category and wherein said instruction type evaluation unit determines upon at least a single bit in said instruction the category of said instruction.

2. Instruction fetching unit according to claim 1 further comprising a instruction load unit having a program counter and an incrementer coupled with said program counter, said incrementer being controlled by said instruction size evaluation unit and said instruction type evaluation unit.

3. Instruction fetching unit according to claim 1 further comprising a decoding unit for determining an operational code of said instruction, wherein said instruction comprises an operational code field indicating an operation including an implicit register assigned to operate with said instruction.

4. Instruction fetching unit according to claim 1 further comprising a first aligning unit coupled between said memory and said instruction buffer for aligning a memory access and a second aligning unit coupled between said instruction buffer and said execution units.

5. Instruction fetching unit for loading instructions from a memory processed by a data processing device, whereby said instructions can be of at least two different lengths, and whereby each instruction contains at least a single bit indicating instruction size, comprising an instruction buffer coupled with an instruction size evaluation unit for determining the instruction size upon said at least single bit of said instruction, and further comprising an instruction type evaluation unit, wherein said data processing device comprises at least two independent execution units for execution of at least two instructions in parallel, whereby the execution units execute instructions of a respective category and wherein said instruction type evaluation unit determines upon at least a single bit in said instruction the category of said instruction, wherein said data processing unit comprises a load/store pipeline for execution of instructions of a first category and an integer pipeline for execution of instructions of a second category.

6. Instruction fetching unit for loading instructions from a memory processed by a data processing device, whereby said instructions can be of at least two different lengths, and whereby each instruction contains at least a single bit indicating instruction size, comprising an instruction buffer coupled with an instruction size evaluation unit for determining the instruction size upon said at least single bit of said instruction, and further comprising an instruction type evaluation unit, wherein said data processing device comprises at least two independent execution units for execution of at least two instructions in parallel, whereby the execution units execute instructions of a respective category and wherein said instruction type evaluation unit determines upon at least a single bit in said instruction the category of said instruction, wherein said instruction fetching unit receives two instructions in parallel and comprises a first multiplexer to distribute a first instruction between a first and second execution unit and a second multiplexer to select said second instruction of said first or second length for said second execution unit.

7. Method of processing instructions in a data processing unit having at least two pipeline structures, whereby said instruction code can be of at least two different lengths, and whereby each pipeline executes instructions of a respective category, comprising the steps of:
  a) fetching a sequential data stream from an instruction memory containing multiple instructions starting at an instruction address,
  b) determining upon at least a single bit of the first data said instruction length,
  c) determining upon at least a further single bit of said first data said instruction category,
  d) determining upon at least a single bit of a second data the instruction length of a subsequent instruction,
  e) determining upon at least a further single bit of said second data the instruction category of said second instruction,
  f) issuing upon said determinations one or more instructions to the respective pipeline structures,
  g) incrementing said instruction address depending on the number of instructions and upon the instruction lengths and types,
  h) repeating steps a) through g).

8. Method according to claim 7, wherein said data processing unit processes instructions of two length, whereby the second instruction length is twice as long as the first instruction length.

9. Method according to claim 8, wherein the single bit for determination of the instruction length is the least significant bit of each instruction.

10. Method according to claim 7, wherein an instruction uses an implicit register for performing a specific operation.

11. Method according to claim 7, wherein a first pipeline structure is responsible for a first instruction category, and step f) comprises:
  i) issuing a first instruction to the first pipeline structure only if step c) determines the first instruction category,
  j) refraining from issuing a second instruction in parallel to the first instruction if the first instruction is not issued to the first pipeline structure.

12. Method according to claim 7, wherein the at least two pipeline structures include a pipeline structure for integer instructions and a second pipeline unit for load/store instructions.

13. Method of processing instructions in a data processing unit having at least two pipeline structures, whereby said instruction code can be of at least two different lengths, and whereby each pipeline executes instructions of a respective category, comprising the steps of:
  a) fetching a sequential data stream from an instruction memory containing multiple instructions starting at an instruction address,
  b) determining upon at least a single bit of the first data said instruction length,
  c) determining upon at least a further single bit of said first data said instruction category,
  d) determining upon at least a single bit of a second data the instruction length of a subsequent instruction,
  e) determining upon at least a further single bit of said second data the instruction category of said second instruction,
  f) issuing upon said determinations one or more instructions to the respective pipeline structures,
  g) incrementing said instruction address depending on the number of instructions and upon the instruction lengths and types,
  h) repeating steps a) through g),
  wherein a first pipeline structure is responsible for a first instruction category, and step f) comprises issuing an instruction to the first pipeline structure only if the instruction is of the first instruction category.

14. Method of processing instructions in a data processing unit having at least two pipeline structures, whereby said instruction code can be of at least two different lengths, and whereby each pipeline executes instructions of a respective category, comprising the steps of:
  a) fetching a sequential data stream from an instruction memory containing multiple instructions starting at an instruction address,
  b) determining upon at least a single bit of the first data said instruction length,
  c) determining upon at least a further single bit of said first data said instruction category,
  d) determining upon at least a single bit of a second data the instruction length of a subsequent instruction,
  e) determining upon at least a further single bit of said second data the instruction category of said second instruction, f) issuing upon said determinations one or more instructions to the respective pipeline structures, g) incrementing said instruction address depending on the number of instructions and upon the instruction lengths and types, h) repeating steps a) through g), wherein the at least two pipeline structures include a first and a second pipeline structure, and step f) comprises:

k) issuing a first instruction to either one of the first or second pipeline structure; and m) issuing a second instruction to the other of the first or second pipeline structure only if the first instruction were issued in step k) to the first pipeline structure.

* * * * *